United States Patent
Gan et al.

(10) Patent No.: US 10,199,067 B1
(45) Date of Patent: Feb. 5, 2019

(54) ADAPTIVE CLEANING OF A MEDIA SURFACE RESPONSIVE TO A MECHANICAL DISTURBANCE EVENT

(71) Applicant: Seagate Technology LLC, Cupertino, CA (US)

(72) Inventors: Swee Chuan Samuel Gan, Singapore (SG); Lihong Zhang, Singapore (SG); Xiong Liu, Singapore (SG); ChengYi Guo, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/934,243

(22) Filed: Mar. 23, 2018

(51) Int. Cl.
*G11B 5/09* (2006.01)
*G11B 23/50* (2006.01)
*G11B 20/18* (2006.01)
*G11B 23/02* (2006.01)
*G11B 5/012* (2006.01)

(52) U.S. Cl.
CPC ............ *G11B 23/507* (2013.01); *G11B 5/012* (2013.01); *G11B 20/1816* (2013.01); *G11B 23/021* (2013.01)

(58) Field of Classification Search
None
See application file for complete search history.

(56) References Cited

U.S. PATENT DOCUMENTS

| | | | |
|---|---|---|---|
| 5,083,231 A * | 1/1992 | Veenstra | G11B 23/505 360/130.3 |
| 5,822,822 A * | 10/1998 | Weng | G11B 23/505 15/97.1 |
| 5,850,321 A * | 12/1998 | McNeil | G11B 5/6005 360/246.2 |
| 6,081,411 A * | 6/2000 | Green | G11B 5/7315 360/135 |
| 6,707,634 B2 | 3/2004 | Kagami et al. | |
| 6,853,508 B2 | 2/2005 | Smith et al. | |
| 6,967,804 B1 | 11/2005 | Codilian | |
| 7,561,367 B2 | 7/2009 | Schreck | |
| 7,872,822 B1 | 1/2011 | Rothberg | |
| 8,995,078 B1 | 3/2015 | Setuwanto et al. | |
| 9,042,047 B1 | 5/2015 | Dube | |
| 9,852,754 B1 | 12/2017 | Martin et al. | |

(Continued)

*Primary Examiner* — Peter Vincent Agustin
(74) *Attorney, Agent, or Firm* — Hall Estill Attorneys at Law

(57) ABSTRACT

Apparatus and method for proactively cleaning a data storage surface subjected to a mechanical disturbance. In some embodiments, data access commands are serviced by a data storage device to transfer user data between a host device and a rotatable data recording surface using a radially moveable data transducer. A media cleaning operation is scheduled and performed in response to the detection of a mechanical disturbance event externally applied to the data storage device. The media cleaning operation involves sweeping the data transducer across the data recording surface from a first radius to a second radius over a selected time duration. The entirety of the data recording surface is swept if sufficient time is available between pending commands to maintain a desired host data transfer rate. Otherwise, a partial cleaning operation is scheduled in which portions of the recording surface are successively cleaned between the servicing of the pending commands.

20 Claims, 7 Drawing Sheets

(56) References Cited

U.S. PATENT DOCUMENTS

| | | | | |
|---|---|---|---|---|
| 2002/0191523 A1* | 12/2002 | Warmenhoven | ..... | G11B 23/505 |
| | | | | 369/72 |
| 2004/0027927 A1* | 2/2004 | Murakami | ............... | G11B 5/41 |
| | | | | 369/13.02 |
| 2005/0242072 A1* | 11/2005 | Van Den Oetelaar | ........................ | |
| | | | | G11B 7/126 |
| | | | | 219/121.69 |
| 2006/0238919 A1* | 10/2006 | Bradley | ............ | G06F 17/30303 |
| | | | | 360/128 |

* cited by examiner

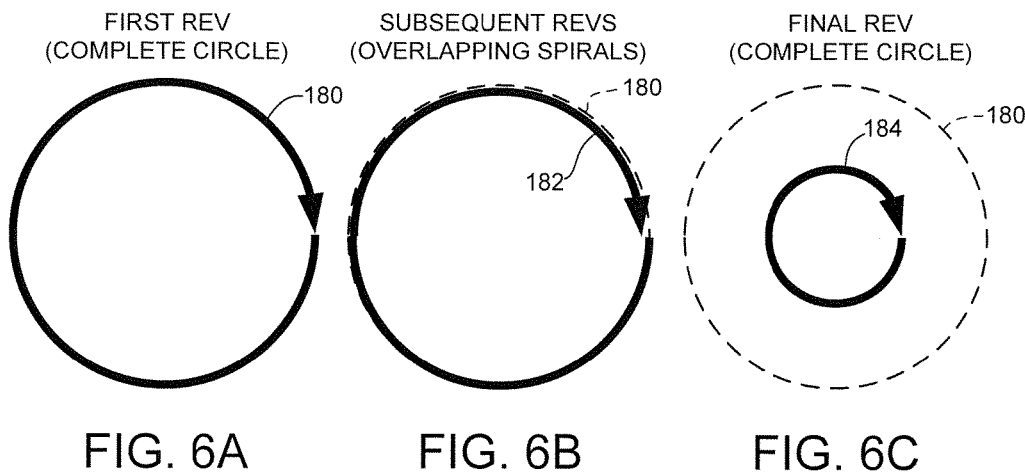
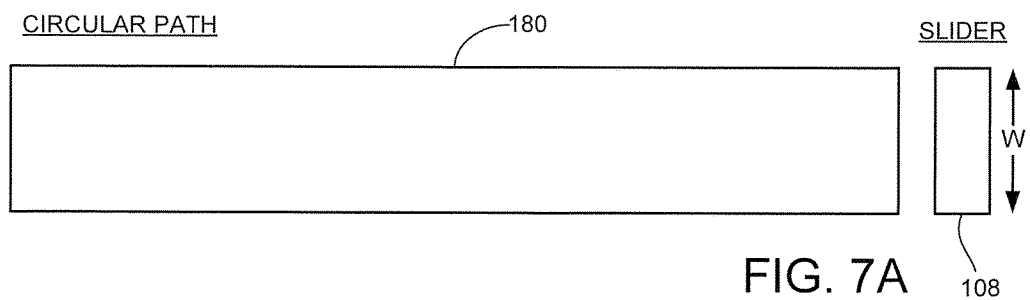
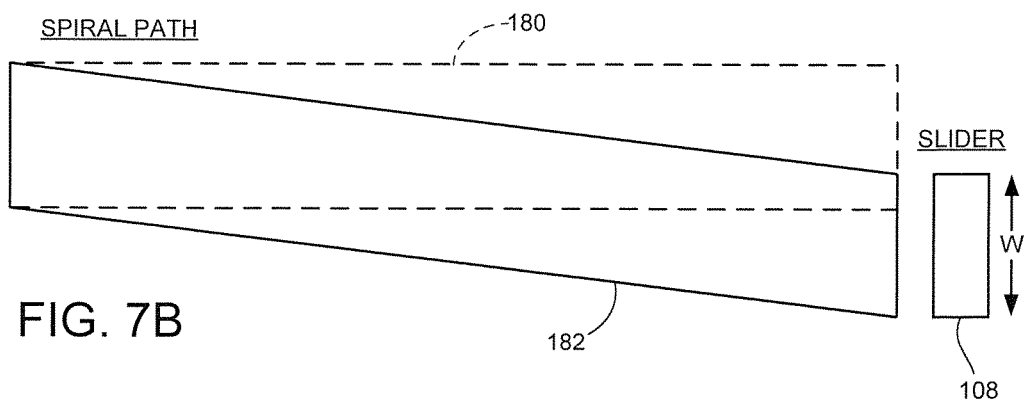

ADAPTIVE CLEANING OF A MEDIA SURFACE RESPONSIVE TO A MECHANICAL DISTURBANCE EVENT

SUMMARY

Various embodiments of the present invention are generally directed to management of a data storage device having a rotatable data storage surface.

In some embodiments, a data storage device has a radially moveable data transducer adjacent a rotatable data recording surface, and a data transfer circuit which directs a transfer of user data between the data recording surface and a host device responsive to data access commands issued by the host device. A mechanical disturbance sensor is configured to detect a mechanical disturbance event that has been externally applied to the data recording surface. An adaptive cleaning circuit is configured to perform a media cleaning operation by advancing the data transducer across the data recording surface from a first radius to a second radius over a selected time duration responsive to the mechanical disturbance event having a magnitude that exceeds a predetermined threshold. The selected time duration is selected responsive to a rate at which the data access commands are issued to the data storage device.

In related embodiments, a method includes servicing data access commands issued by a host device to transfer user data between the host device and a rotatable data recording surface using a radially moveable data transducer; detecting a mechanical disturbance event externally applied to the data recording surface; and performing a media cleaning operation by advancing the data transducer across the data recording surface from a first radius to a second radius over a selected time duration responsive to the mechanical disturbance event having a magnitude that exceeds a predetermined threshold, the selected time duration selected responsive to a rate at which the data access commands are issued to the data storage device.

These and other features and advantages of various embodiments can be understood with a review of the following detailed description in conjunction with the accompanying drawings.

BRIEF DESCRIPTION OF THE DRAWINGS

FIGS. 6A, 6B and 6C show successive advancement paths of the slider of FIG. 1 during a cleaning operation.

FIGS. 7A and 7B show further details with regard to the advancement paths.

DETAILED DESCRIPTION

Figure 1:
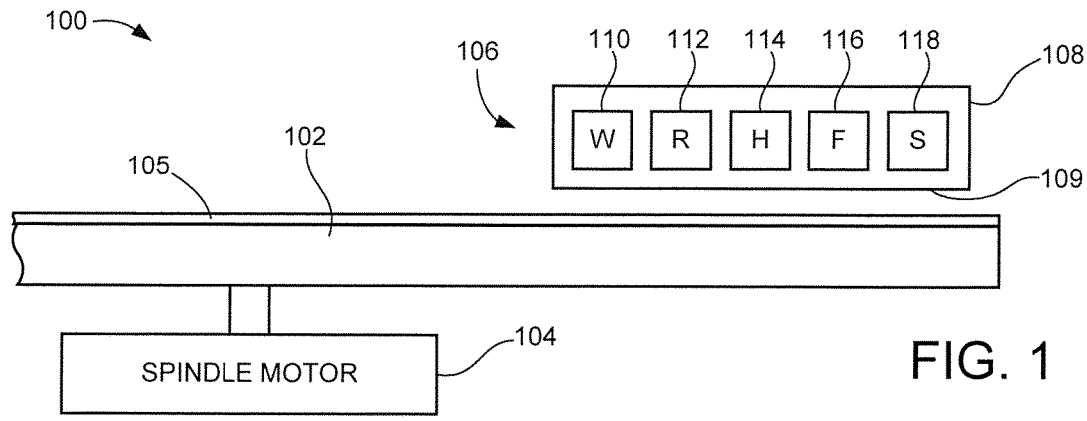
FIG. 1 shows a head/media combination of a data storage device constructed and operated in accordance with some embodiments.

The present disclosure is generally directed to data storage systems, and more particularly to reducing the effects of contaminants upon the surfaces of rotatable data recording media.

Some data storage devices store data using rotating data recording media. The media may take the form of one or more rotatable magnetic recording discs which are accessed using a corresponding array of data transducers or read/write heads. The transducers incorporate sliders with air bearing surfaces that aerodynamically support the sliders in close proximity to the media surfaces by fluidic currents of the surrounding atmosphere established by high speed rotation of the media.

Write elements are supported by the sliders to magnetically write data in the form of alternating magnetic patterns to tracks defined on the media surfaces. Read sensors are supported by the sliders to sense the magnetic patterns and recover the previously stored data. Other active and passive elements can be incorporated into the sliders such as a head assisted magnetic recording (HAMR) system, a fly height adjustment mechanism, a contact sensor, etc.

Efforts are made to manufacture data storage devices with ever smaller slider clearance distances (fly heights) and greater numbers of tracks per linear distance (track densities). A current generation data storage device may have a typical slider fly height of a few angstroms, Å ($10^{-10}$ m) or less and a typical track density of several hundred thousand tracks per inch (e.g., $10^5$ TPI) or more. The interior of a data storage device is strictly controlled in an effort to provide a clean and stable environment for the operation of the device.

The presence of contaminants within the interior of a data storage device can significantly degrade the performance of the device. Contaminants can come in a variety of forms and can be introduced from a number of different sources. Examples include airborne particulates generated within or released into the interior of the housing, motor lubricants such as leaked oil from a spindle motor used to rotate the media or grease from a pivot cartridge used to rotate the data transducers, outgassing of various materials used within the device, localized accumulations of fluorocarbon-based lubrication applied to the media surfaces, etc. Accumulation of even small amounts of these and other types of contaminants onto a media surface can introduce a number of deleterious effects such as translational head modulation, changes in fly height and, in severe cases, damage to the media and/or slider through kinetic impact.

Modern disc-based data storage devices are often configured to schedule routine cleaning operations during idle periods in an effort to reduce the presence of contaminants that may have accumulated on the various data recording media surfaces. At such time that no pending host commands are present, a data storage device may transition to an idle mode of operation in which various background operations are carried out while the device waits for new host commands.

Among these operations may include one or more single direction or bi-directional sweeps to slowly advance the transducers across the associated media surfaces. This sweeping movement of the transducers is designed to controllably deflect any contaminants to a safe location away from the data recording surfaces or otherwise smooth out local disruptions in the lubricant layers.

While operable, these and other routines of the existing art are not readily implemented during periods of device operation in which the storage device is currently servicing queued data transfer commands from a host.

Various embodiments of the present disclosure are directed to a method and apparatus for mitigating the effects of contaminants in a data storage device. As explained below, the various embodiments are generally configured to respond to detected conditions that may produce or enhance the presence of contaminants, such as a result of external mechanical disturbance events applied to a storage device, and to adaptively tailor a suitable cleaning profile in view of ongoing host I/O data transfer requirements.

Some embodiments include at least one radially moveable data transducer adjacent to a corresponding rotatable data recording surface. In practice, multiple data recording surfaces may be provided from magnetic recording discs arranged in a disc stack. An array of transducers may be configured to be moved together across the recording surfaces using a radial actuator.

A control circuit is provided to direct a transfer of user data between each of the data recording surfaces and a host device in response to data access commands issued by the host device. The data access commands include read commands to read data and write commands to write data.

An adaptive cleaning system is provided to monitor and detect the application of external mechanical disturbance events to the storage device. Upon detection of an event of sufficient magnitude to potentially dislodge, generate or otherwise migrate contaminants onto the recording surfaces, a cleaning manager circuit evaluates the current status of the storage device and adaptively schedules a cleaning operation to remove the potential contaminants from the media surfaces.

The cleaning operation may involve a full cleaning sequence or a partial cleaning sequence. A full cleaning sequence generally involves performing one or more single-direction or bi-directional movements (sweeps) of the transducers across the full radial width of the recording portions of the surfaces. The full cleaning sequence may be carried out if the cleaning system determines that the storage device is in an idle period of operation (e.g., no pending host access commands are pending), or if there is sufficient time available to perform the full cleaning sequence before executing the next pending access command.

A partial cleaning sequence is scheduled and executed if there is insufficient time, based on current host access commands or other factors, to perform a full cleaning sequence. A partial cleaning sequence breaks up the cleaning operation into a number of smaller radial increments that are performed as required between the servicing of ongoing host access commands.

The partial cleaning sequences are selected, scheduled and performed based on a number of parameters. These parameters can include, but are not limited to, recent access history, the number of pending access commands and the locations on the media associated therewith, overall specified response (e.g., sustained data transfer) rates, various system dimensions, etc. The partial cleaning sequences may be broken up into a number of increments for different zones across the surface(s), and the zones are prioritized for execution of the localized sweeping operations in a suitable order.

In one embodiment, zones that are most currently accessed are swept first, followed by zones that are predicted as being potentially accessed in the near future. Because contaminants should generally be ultimately swept to the outermost extents of the surfaces, the sweep strategy will clean the zones in an order that tends to reduce the need to re-sweep previously cleaned zones. Eventually, when sufficient time permits, the partial cleaning sequence can be followed by one or more full cleaning sequences during an idle period. In this way, potential damage or performance interruptions due to contaminant migration can be mitigated while maintaining ongoing data transfer performance at acceptable levels.

These and other features and advantages of various embodiments can be understood beginning with a review of FIG. 1 which shows aspects of a data storage device 100. The device 100 incorporates rotatable data storage media such as in the case of a hard disc drive (HDD) or a hybrid drive, although other forms of media can be used.

In the example of FIG. 1, one or more data recording media 102 in the form of magnetic recording discs are provided to store user data from a host device. The discs are axially aligned and rotated by a spindle motor 104 at a constant high speed. A thin layer of lubricant 105 is applied to coat and protect each recording surface. The lubricant 105 is contemplated but not necessarily required.

A data transducer 106 is controllably positioned adjacent the disc 102. The transducer 106, also referred to as a head, includes a slider 108 with an air bearing surface (ABS) 109 configured to support the slider 108 in close relation to the recording surface of the disc 102 using fluidic atmospheric currents established by high speed rotation of the disc 102.

The slider 108 supports a write element (W) 110 to write data to the disc 102 and a read sensor (R) 112 to subsequently read back the previously written data. Other elements can be supported by the slider 108 as well, including but not limited to a heat assisted magnetic recording (HAMR) system (H) 114, a fly height adjustment mechanism (F) 116 and one or more contact sensors (S) 118.

Figure 2:
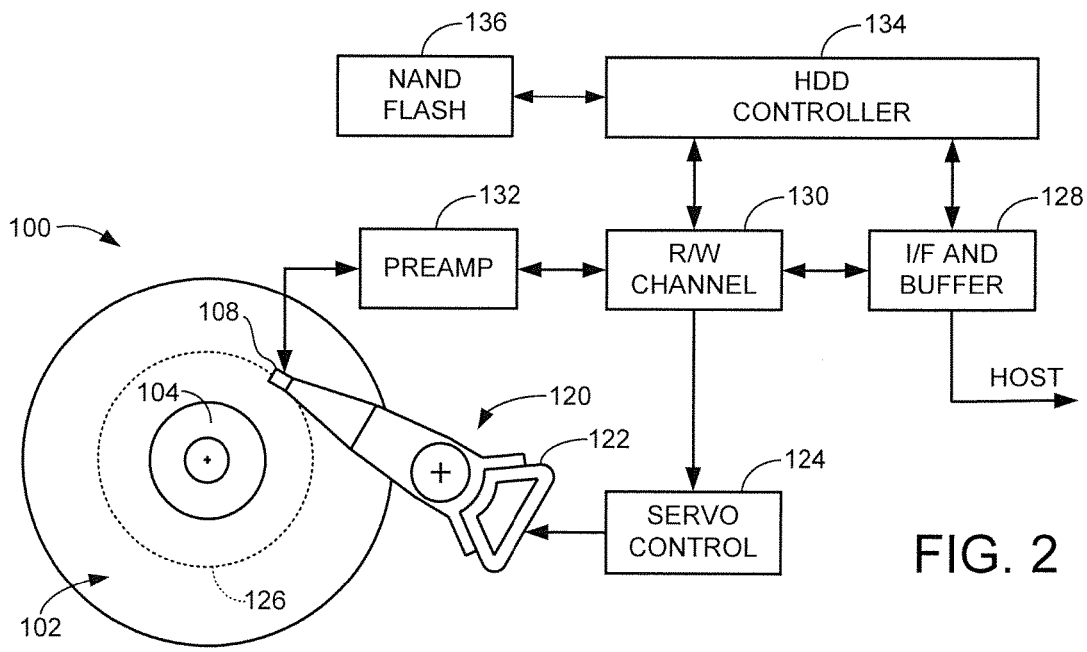
FIG. 2 is a functional block representation of aspects of the data storage device of FIG. 1.

FIG. 2 shows the storage device 100 of FIG. 1 in greater detail. The magnetic recording medium 102 is clamped to and rotated by the spindle motor 104 about a central axis. Multiple discs 102 may be axially mounted in a spaced apart relation to form a disc stack, with each disc providing opposing upper and lower recording surfaces. A corresponding transducer 106 may be supplied for the storage of user data to each surface.

An actuator 120 is disposed adjacent an outermost peripheral edge of the disc 102 and pivots about a pivot point to radially advance the transducers 106 across the respective data recording surfaces through application of current to a voice coil 122 of a voice coil motor by a servo control circuit 124. This operation aligns a particular transducer with a corresponding data track on the associated recording surface. One such track is denoted at 126.

A data transfer circuit between the transducers 108 and the external host device includes an interface (I/F) and buffer circuit 128, a read/write (R/W) channel 130 and a preamplifier/driver (preamp) circuit 132. Other formats for the data transfer circuit can be used. Generally, the data transfer circuit operates to direct a transfer of user data between the data recording surfaces of the discs 102 and a host device responsive to data access commands issued by the host device.

A top level HDD controller circuit 134 provides top level control of the storage device, and forms a portion of the data transfer circuit. The controller 134 incorporates a hardware processing circuit and/or one or more programmable processors that execute program instructions (e.g., firmware) stored in a local memory. A local non-volatile memory (NVM) such as NAND flash module 136 can be used to provide tiered storage such as in a hybrid drive application, an NVM write cache, etc.

Figure 3A:
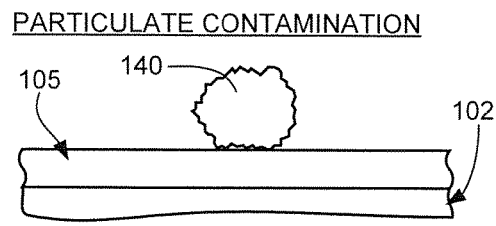
FIGS. 3A and 3B depict different types of media contamination that can accumulate such as resulting from a mechanical displacement event.
Figure 3B:
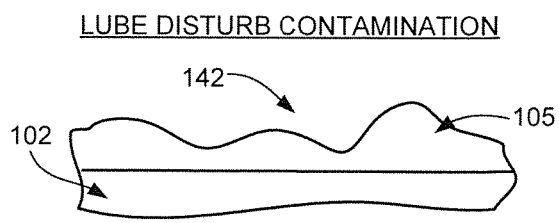

High speed data transfers with the host may be affected by the presence of one or more contaminants on the recording surfaces of the discs 102. Examples of different types of contaminants are generally illustrated in FIGS. 3A and 3B. Other forms of contaminants may be present as well so these are merely exemplary and not limiting.

FIG. 3A shows particulate contaminants 140 that may be formed by solid or viscous fluid particles. These particles migrate to various locations on the recording surfaces. When the lubricant layer 105 is used, the particles can adhere to, or become embedded within, the lubricant.

FIG. 3B illustrates so-called lube-disturb 142. Lube-disturb generally involves localized regions in which the lubricant layer 105 has been disturbed and displaced, so that the normally uniform-thickness lubricant has troughs, valleys and/or other non-uniform features that are classified herein as "lube-disturb regions" or "lube-disturb contaminants." Depending on size and severity, lube-disturb regions can cover a radial width that spans multiple adjacent data tracks on the associated recording surface.

These and other forms of contaminants can interfere with the controlled positioning of the slider 108 in a number of ways. Kinetic contact between the slider 108 and a particle such as 140 may result in radial and vertical deflection of the slider, introducing position error in the relative location of an active element such as a read or write element with respect to a track. If the kinetic contact is sufficiently severe, damage can be induced to the air bearing surface and/or disc surface.

The presence of lube-disturb regions such as 142 can induce unwanted radial and vertical slider displacements due to the changes in localized topography of the head/disc interface. Lube-disturb regions can also result in the transfer of "globs" of lubricant from the layer 105 onto the slider, further adversely affecting the controlled flight characteristics of the transducer. In an extreme case, a large amount (or "droplet") of the lubricant can be picked up by the slider in one lube-disturbed location and deposited onto another location, thereby smearing the lubricant in a non-uniform manner and increasing the amount of disturbed lubricant on the surface.

It has been observed by the inventors of the present disclosure that enhanced levels of contaminants can be introduced to the media surfaces as a result of the application of an external mechanical disturbance event to a storage device. Such disturbances can arise from a variety of sources.

The routine handling or movement of the storage device can result in the dislodging of contaminants within the device housing, as can the application of high frequency, short duration (e.g., shock) events such as a result of the device being dropped or otherwise jarred. Vibrations can be transmitted to the housing from an adjacent operational storage device, or during the removal and installation of adjacent equipment. In extreme cases, contaminants can be generated through contact between the slider and recording surface in a particular head/disc interface. Other sources and types of disturbances that may be applied to a data storage device housing will readily occur to the skilled artisan.

Figure 4:
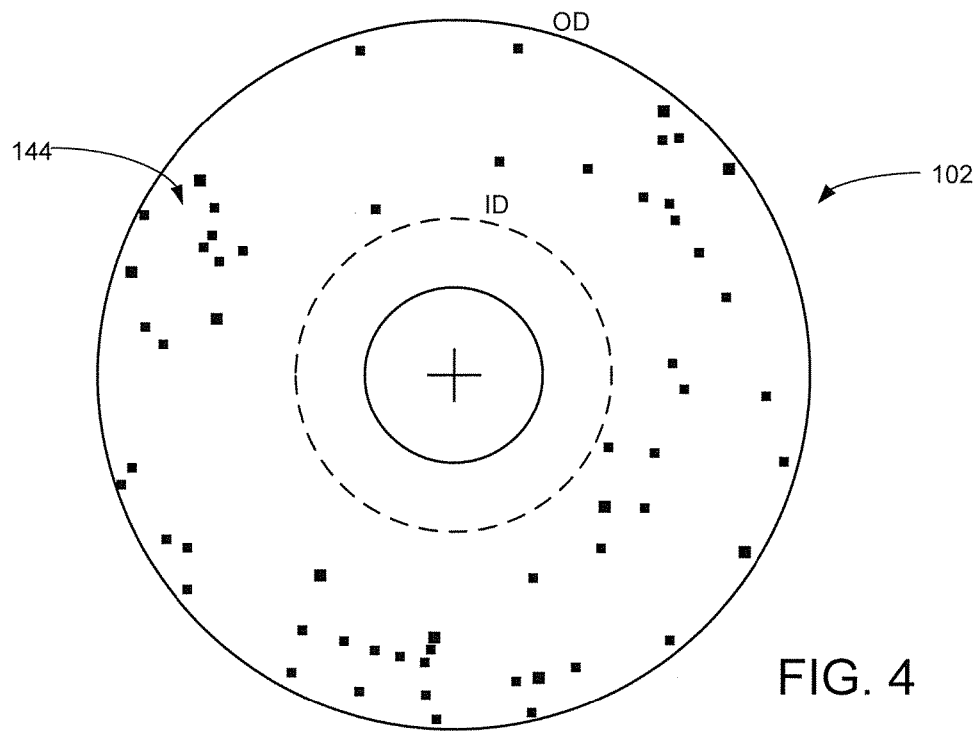
FIG. 4 shows a contamination map of an exemplary data storage medium to depict contaminants such as illustrated in FIGS. 3A-3B.

FIG. 4 shows a contaminant map for a selected data storage disc 102 to represent real world data obtained from a data storage device that was subjected to a mechanical disturbance event. Blocks 144 represent locations and relative sizes of contaminants that were located on the examined disc. It will be appreciated that FIG. 4 is merely representative of the types of patterns, quantities and locations of contaminants that were experienced in one particular device, so that different storage devices may experience different response characteristics based on a large number of factors. Nevertheless, it can be seen that, if sufficiently severe, a mechanical disturbance event can result in the generation of significant levels and distributions of contaminants that were not present prior to the disturbance event.

Figure 5:
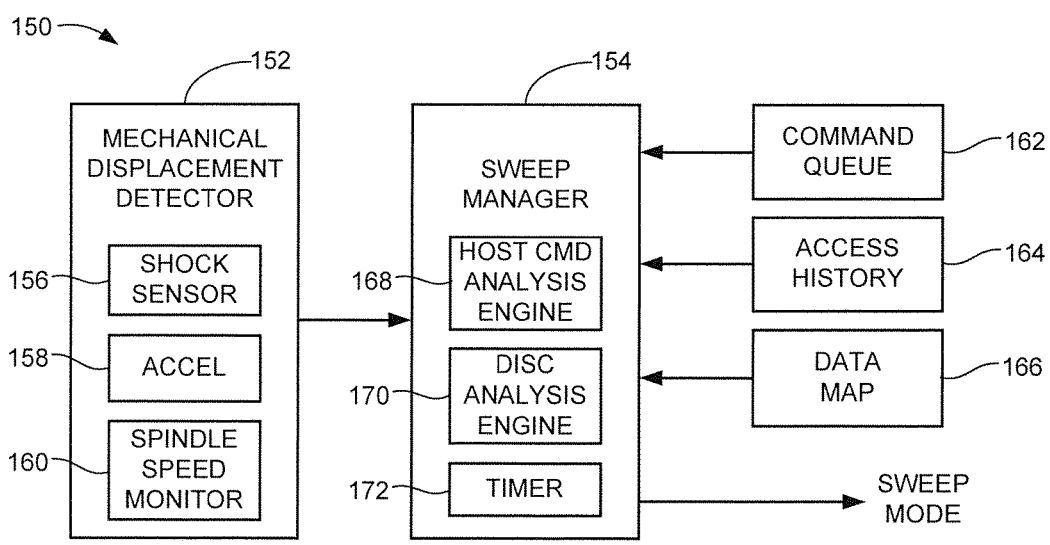
FIG. 5 shows a media surface cleaning system incorporated into the data storage device to perform periodic media cleaning operations in accordance with some embodiments.

FIG. 5 shows a functional block diagram for an adaptive cleaning system 150 of the data storage device 100 in some embodiments. The system 150 operates to detect the application of mechanical disturbance events and to schedule one or more cleaning operations to mitigate potential performance degradations or damage that may result as a result of the disturbance event. Aspects of the system 150 may be realized as a portion of the HDD controller 134, or other portions of the device 100.

The system 150 includes a mechanical displacement detector circuit 152 and a sweep manager circuit 154. The detector circuit 152 uses one or more sensor configurations to detect an applied mechanical disturbance event. Displacement detection can be carried out through the use of a shock sensor 156, one or more single or multi-axial accelerometers 158, a spindle speed monitor 160, etc.

The shock sensor 156 detects high frequency transient physical excitations, such as a pulsed acceleration/deceleration event associated with an impact or similar type event. The accelerometers 158 are configured to measure longer duration mechanical vibrations over a relatively large frequency spectrum. The spindle speed monitor 160 can detect disturbance events that induce localized changes in the rotational velocity of the spindle motor. Other forms of disturbance sensors can be used as desired such as but not limited to strain gauges, piezo monitors, off track disturbance observers, PES analysis filters, etc.

In some cases, the detector circuit 152, also referred to herein as a mechanical disturbance sensor, applies suitable signal conditioning to indicate, to the sweep manager 154, a mechanical disturbance event of sufficient magnitude has been applied to the device 100. To this end, the detector circuit 152 can include processing circuitry to establish threshold values to indicate a particular disturbance event is of sufficient magnitude to warrant a cleaning operation. In this way, the sweep manager can be configured to only receive notifications when a cleaning operation is needed.

The disturbance measurements may be based on signal strength, duration, displacement power, mechanical strain, or any other suitable factor. Threshold values can be empirically determined based on design and test data, or can be individually and adaptively adjusted based on observed performance over time by each device.

For example, the detector circuit 152 can generate a disturbance signal responsive to a mechanical disturbance event and can compare a magnitude of the disturbance signal to a predetermined threshold. The detector circuit can then forward a notification signal to the sweep manager when the magnitude of the disturbance signal exceeds the predetermined threshold. The predetermined threshold can be selected, for example, in response to an accumulated count of off track errors encountered by the transducer after a previously detected mechanical disturbance event. In this way, the system can observe and monitor the effectiveness of the threshold settings and adjust as required.

The detector circuit 152 may form a portion of a SMART (system monitoring, analysis and reliability technology) system that logs system parameters for use by other aspects of the storage device. Various sweeping actions carried out by the system can also be logged for future analysis.

The sweep manager 154, also referred to as an adaptive cleaning circuit, evaluates the state of the storage device 100 in response to receipt of a disturbance event signal from the detector 152 This may include receipt of information from other sources including a command queue 162, an access history data structure 164 and a data map 166. The command queue 162 lists the pending host access commands (e.g., read and/or write commands) that are currently waiting to be serviced by the device 100. The access history 164 provides a record of recent accesses that have been carried out by the host to indicate relative host interest in different blocks (e.g., logical block addresses, LBAs) of data. The data map 166 provides a map of the locations at which the various host user data blocks are stored within the disc stack. Other types and forms of data may be accessed by the sweep manager 154 as required.

The sweep manager 154 includes a host command analysis engine 168, a disc analysis engine 170 and a timer 172. These elements operate to evaluate the respective host based and disc based parameters to identify a suitable cleaning profile. If sufficient time is available, the entire media surface will be swept using a full cleaning operation. If not, a partial cleaning operation will be scheduled.

FIGS. 6A through 6C show a sweep profile that can be taken by a selected transducer during a cleaning operation. Other profiles can be used. It will be appreciated that a selected one of the transducers will be activated to provide servo control, and the remaining transducers in the stack will concurrently follow the same path as the actuator 120 is moved (see FIG. 2). In this way, all of the media surfaces are swept over essentially the same radial areas at the same time.

The example sweeping path of FIGS. 6A-6C begins with a spiral with a first closed circle 180 (FIG. 6A) at a first radius on the media surface, followed by a series of overlapping spiral paths 182 (FIG. 6B) that repetitively advance the transducer inwardly toward the ID of the media surface, and ends with a final closed circle 184 (FIG. 6C) at a second radius on the media surface. The closed circles 180 and 184 each constitute a full (e.g., at least 360 degree) passage of the transducer with respect to the media surface. A similar profile can be used for sweeps that move outwardly toward the OD.

The first closed circuit 180 and the first spiral path 182 are shown as flat projections in FIG. 7A over a full 360 degrees of rotation. The effective physical width of the slider is represented by the width "W. The linear characteristics of spiral path 182 indicate that a nominally constant radial velocity is applied to the slider 108. Such a constant velocity is contemplated to be applied over each of the spirals; however, in other embodiments, different velocities can be used for different spirals or within a given spiral as required.

It is contemplated that the sweeping path will be designed to be highly efficient and effective, so that as much of the media surface is covered as possible within a host-tolerable duration such that host data transfer rate performance is not adversely degraded beyond an acceptable limit. A passive fly height condition is contemplated for the sweep, but a different height can be used including a higher than normal or lower than normal altitude for the activated transducer.

The spiral path portion of the cleaning operation involves some overlap of the previous path. Using W to represent the slider ABS width, a predefined amount of overlap of the width may be selected to provide seamless surface coverage. In one example, an overlap of 20% is used, providing a constant step width of 0.8 W over each revolution. Any suitable overlap percentage can be used from essentially 0% to 100%, although lower values will tend to provide faster cleaning.

The cleaning time required to fully clean a given media surface will be based on a number of factors associated with the design and construction of the device. In one example using a 2½ inch form factor HDD with storage media having an outermost diameter of nominally 65 millimeters, mm, the initial track radius may be set at 31.66 mm (R1=31.66 mm), the last track radius may be set at 13.84 mm (R2=13.84 mm), the rotational rate is 5400 revolutions per minute, rpm (or 11.11 milliseconds, ms/rev), the slider width is approximately 0.7 mm (W=0.7 mm), and a 20% step overlap is used (Step_Overlap=0.20).

The total number of revolutions (Total_Revs) to complete the full cleaning operation may be calculated as follows:

$$\text{Total\_Revs} = 2 + (R2 - R1)/(W - \text{Step\_Overlap}) \quad (1)$$

$$= 2 + (31.66 - 13.84)/(0.7 - 0.2)$$

$$= 2 + (17.82)/0.5 = 37.64$$

Under these conditions, it would take approximately 38 revolutions to cover the full medium, including the initial and final complete circles. The time required to complete a full cleaning operation, Time_Complete, can be calculated as:

$$\text{Time\_Complete} = (\text{Total\_Revs})(\text{Time\_Per\_Rev}) \quad (2)$$

$$= (38)(11.11) = 422.18 \text{ ms}$$

A full cleaning operation would thus require about 420 ms to complete based on these factors. It will be appreciated that different values for the above factors will provide different total completion times and required numbers of revolutions.

Figure 8:
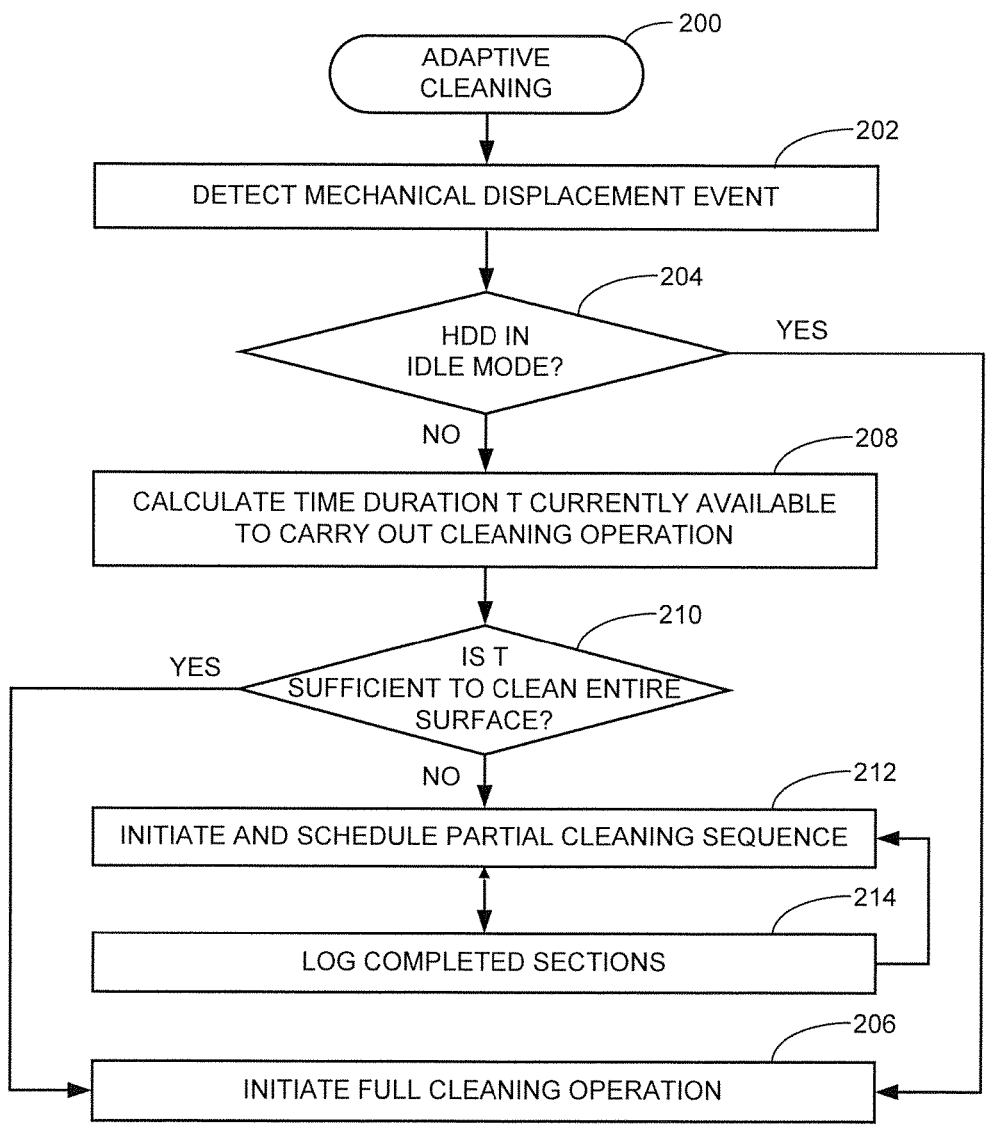
FIG. 8 is a flow chart for a cleaning management routine illustrative of steps carried out in accordance with some embodiments.

FIG. 8 provides a flow chart for an adaptive cleaning routine 200 to set forth steps carried out by the adaptive cleaning system 150 of FIG. 5 in accordance with some embodiments. The various steps may be realized using hardware circuits and/or programmable processing steps executed by a processor. The routine can be modified, appended, performed in a different order, etc. as required. The routine 200 is contemplated as representing a background routine that runs during other operations by the device 100.

The routine commences at step 202 where a mechanical displacement event is detected by the detector circuit 152. As discussed above, the displacement event will have sufficient magnitude in terms of duration, power, frequency, etc. to warrant a preventative cleaning operation.

Decision step 204 determines whether the device (HDD) 100 is currently in an idle mode of operation. An idle mode is a time period during which no pending host access commands are present in the command queue 162 (FIG. 5). During the idle mode of operation, the HDD may be in an operational ready mode with the discs fully rotated at the normal operating speed and the transducers located out adjacent the various media surfaces. The HDD may alternatively be in a reduced power mode during the idle mode such that the transducers have been offloaded from the media surfaces (such as on an unload ramp), the discs may have powered down to a non-rotating state, etc.

The risk of displaced contaminants onto the media surfaces exists irrespective of whether the HDD is in an idle mode or normal operational mode. Nevertheless, if the disturbance event is encountered during normal operation with pending host commands, this raises the issue of how to best perform the cleaning while still servicing the pending commands.

Should the routine determine that the HDD is in fact in idle mode, the flow passes from step 204 to step 206 where a full cleaning operation is initiated and performed. This will involve (at least one) full cleaning sweep across the entirety of the media surfaces. Based on the example calculations provided above, this will consume about 420 ms. Should the discs be in a non-rotational condition, the system 150 may elect to either proceed to power up the discs to perform the cleaning operation, or will schedule the cleaning operation to occur once the device 100 is transitioned back to normal operational mode.

If a host command is received during the execution of the full cleaning sweep, the system 150 can complete the sweep before servicing the command, or can interrupt the sweep operation to service the command. In this latter case, servicing the newly received command may involve switching to a new transducer associated with the media surface that stores or will store the user data, performing a seek operation to move the selected transducer to the destination track, and carrying out the command (e.g., writing data to or reading data from the destination track). Once the command has been serviced, the cleaning operation can be resumed.

Returning to decision step 204, should the system 150 determine that the HDD is not currently in idle mode, the routine passes to step 208 where the manager 154 identifies the maximum amount of time T that is available time to carry out the cleaning operation. The flow next passes to step 210 where decision step determines whether T is of sufficient duration to enable a full cleaning operation. If so, the flow returns to step 206 and a full cleaning operation is initiated. If not, a partial cleaning operation is developed, scheduled and initiated as shown at step 212. As discussed above, a partial cleaning sequence is used to initially clean a portion of the media surfaces. Each cleaned area is logged, step 214, and in subsequently available cleaning cycles new areas are cleaned until the entire media surface has been processed.

The time T determined at step 208 will depend on a number of factors. The average rate at which host access commands have been received and serviced may be taken into account in determining an acceptable duration. Customer specifications can be provided that only allow a certain number of commands X to take longer than some maximum specified time, so that the remaining commands within a given period are required to be serviced in less than the maximum specified time. A write or read dominated environment may also influence the available time since writeback caching or other techniques can be used to delay the writing of the data. Similarly, commands that can be serviced from a read cache or other location (e.g., flash 136, etc.) not associated with the media surfaces can be excluded from the calculation.

In one example, it may be determined that, at most, 40 ms can be used to perform cleaning operations between the servicing of commands, so the cleaning operation may be broken up into roughly 40 ms segments. The segments may be selected in an order that brings the transducer, at the conclusion of the sweep, to a radial position that is relatively near a location necessary to service the next command. Modern data storage devices often permit the use of deep command queues that can queue up and schedule dozens or hundreds of commands. Servo processing algorithms are employed to schedule execution of the commands using radial and rotational latency to provide an efficient sequence of execution. In such case, the servo processor can insert the partial sweeps at suitable locations within this sequence.

Figure 9:
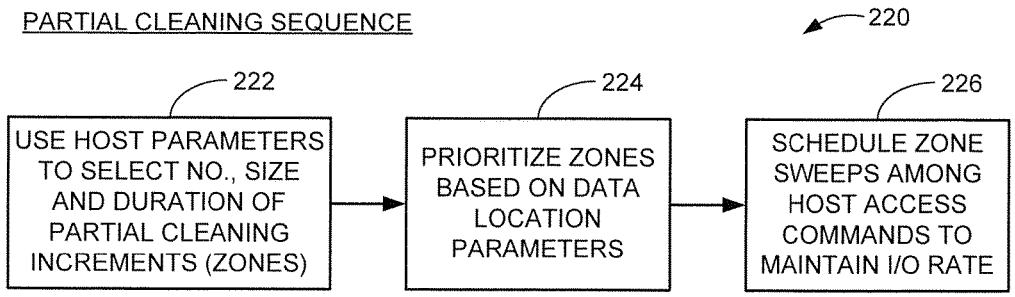
FIG. 9 provides a partial cleaning sequence of the routine of FIG. 8 in some embodiments.

FIG. 9 provides a flow sequence 220 to further illustrate the development of a partial cleaning sequence from FIG. 8. Step 222 involves using host based parameters to select the number, size and duration of various partial cleaning increments or zones. While not necessarily limiting, one approach can use the equations provided above to work, from the maximum allowable time, the starting and ending radii (R1 and R2) for each zone. It will be noted that constant angular velocity (CAV) discs are rotated at a constant angular velocity, so the time required for each revolution is the same irrespective of the radial locations of the transducers. Other forms of discs however, such as CLV (constant linear velocity) discs, speed up or slow down based on radius and can therefore provide different cleaning times per rev based on radius.

Zones can also be selected to have boundaries that correspond to certain areas (e.g., constant data recording density zones, bands of shingled magnetic recording tracks, etc.) that are likely to be accessed frequently or as a group. However formulated, the entire number of zones should nominally cover the entire radial extent of the media surfaces in at least most embodiments. However, it is contemplated that some areas may be exempt from or subjected to delayed cleaning based on other factors. For example, if a portion of the device is currently not utilized in the storage of user data, such as the one-third (⅓) innermost cylinders, then the initial cleaning operation may only be applied to the two-thirds (⅔) outermost cylinders to clean those areas most likely to interfere with ongoing access operations.

Once the zones have been defined, the flow in FIG. 9 passes to step 224 where the zones are prioritized based on various data location parameters. While not necessarily required, it is contemplated in at least some embodiments that some zones may represent higher interest locations and should therefore be cleaned prior to other zones. Zones of recent interest or zones that cover areas that have had relatively high levels of user access can be promoted within the zone servicing profile. Zones near the current locations of the transducers can also be given priority as this provides a good starting point for the sweeping operation.

Once a prioritized sequence is identified, the zone sweeps are scheduled and performed among and between the servicing of various pending host commands, step 226. The rate at which the sweeps are performed can vary; in some cases, a partial sweep can be carried out for a radial band that covers some number of pending commands for nearby data blocks, after which those pending commands can be serviced. The next zone can be selected in like fashion for some other group of pending commands, and so on.

In one embodiment, the system may determine there is sufficient time to perform a sweep to a destination track at which the next command in the queue is to be serviced; in this case the transducer may perform a "seek" as a set of overlapping spirals to that destination track. The sweep may intentionally overshoot the destination track a small radial distance to "clear the area" after which the transducer can be quickly positioned onto the destination track to service the command.

While generally it is preferable to sweep each location before attempting to service commands from that location, based on the current workload it may be desirable to risk the possibility of command collision and cache some amount of readback data to local memory (e.g., buffer 130, flash 136, etc.) to allow cache hits on read commands prior to implementing the sweeps.

Figure 10A:
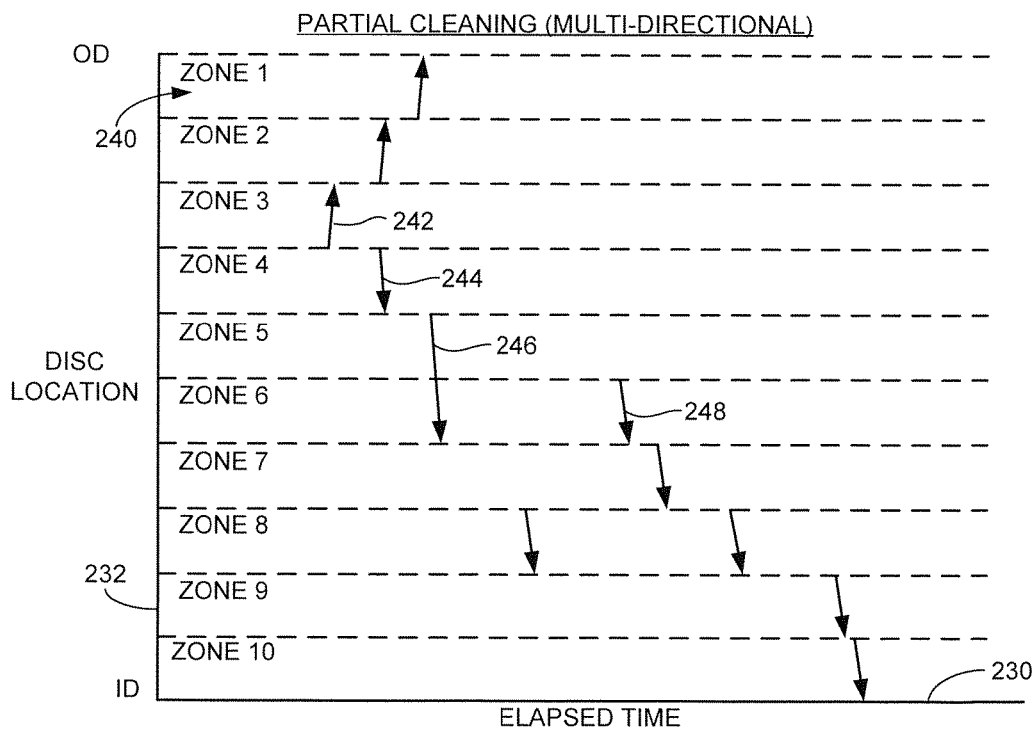
FIGS. 10A-10C provide timing diagrams illustrating partial and full cleaning operations in some embodiments.
Figure 10B:
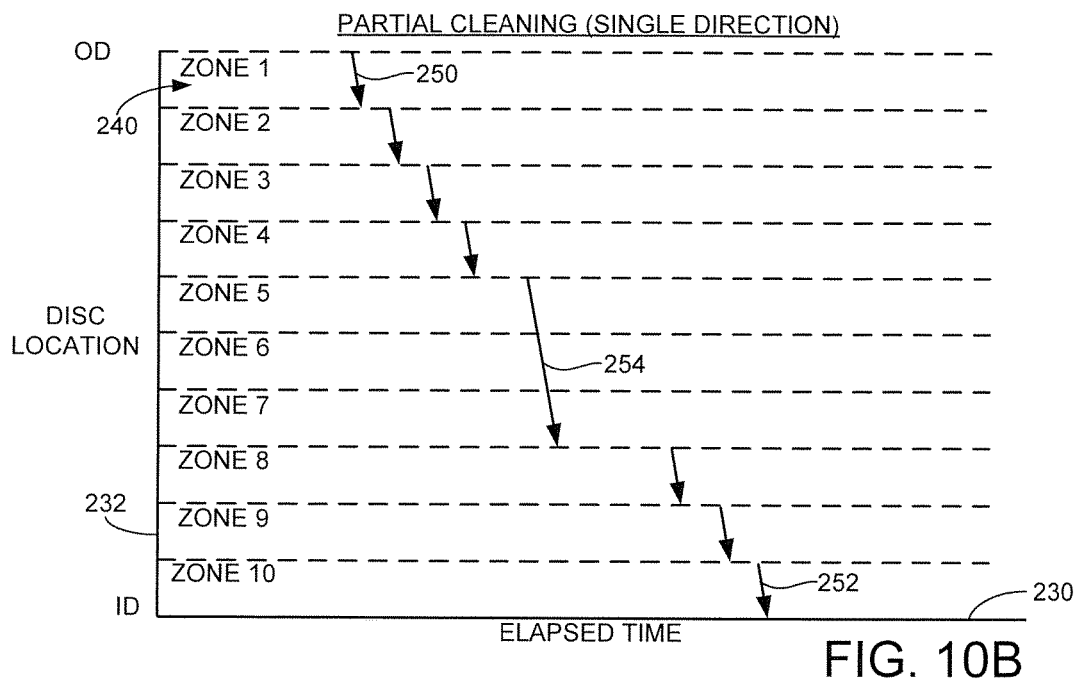
Figure 10C:
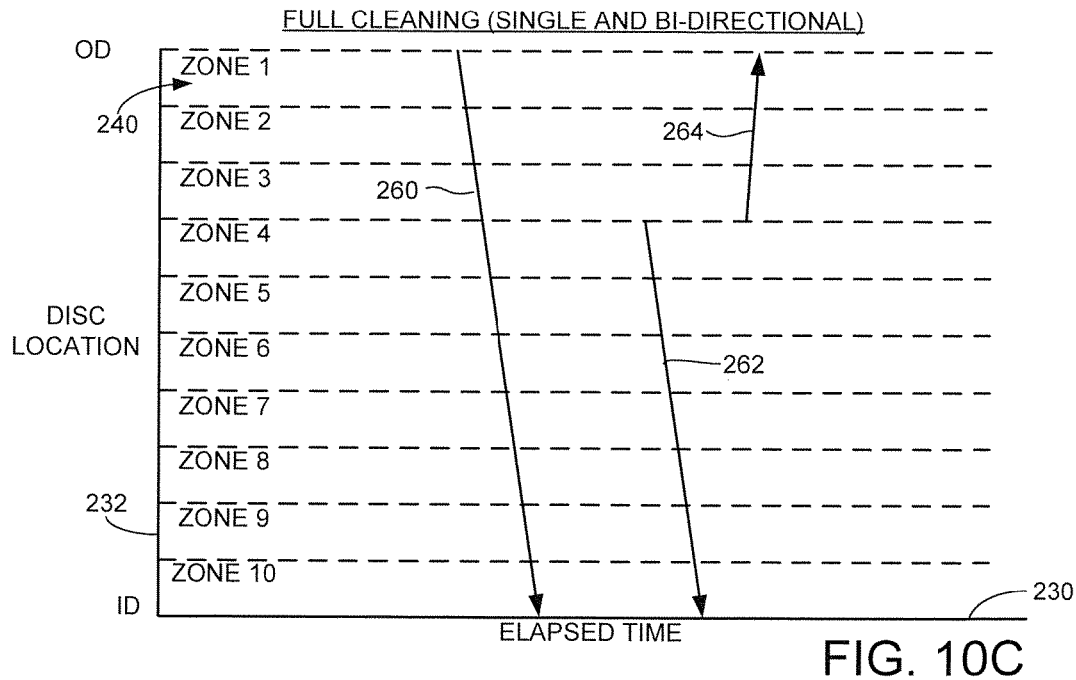

FIGS. 10A through 10C show graphical representations of various partial and full cleaning sweep operations that may be carried out by the system 150 of FIG. 5 using the routine of FIG. 8. It will be appreciated from the discussion above that a notable distinction between a partial cleaning sweep operation and a full cleaning sweep operation is that, between the partial cleaning sweep operations, one or more host access operations are carried out to move a transducer to a particular location to transfer data between a media surface and a host device. By contrast, no such host access operations are carried out during or between aspects of a full cleaning sweep operation.

Beginning with FIG. 10A, this figure illustrates an example multi-directional partial cleaning operation. A horizontal x-axis 230 represents elapsed time. A vertical y-axis 232 represents radial position across a selected disc surface, from innermost diameter (ID) to outermost diameter (OD). The partial cleaning operations shown by the various arrows in FIG. 10A are multi-directional, so that some sweeps are directed toward the OD and some toward the ID. Each arrow is angled slightly to represent the elapsed time required to perform each sweep, although it will be appreciated that the drawing is not intended to be drawn to scale.

A number of concentric zones are denoted at 240. In this example, a total of ten (10) zones have been identified as Zones 1-10. Other numbers of zones can be used. Each zone 240 has the same radial extent and, in a CAV application, nominally the same sweep duration. In other embodiments, the zones 240 may have different radial widths and sweep durations.

A first partial cleaning sweep for Zone 3 is indicated at 242. This represents the operation by the system 150 to select Zone 3 as the first zone to be swept. It is contemplated in this example that one or more host access commands in the vicinity of Zone 3 are immediately carried out before or after this sweep, although such is not required.

The next partial cleaning sweep is shown for Zone 4 at 244. While sweep 242 is toward the OD, sweep 244 is toward the ID. This arrangement may be useful when the system 150 determines that a large amount of pending or predicted host accesses are to take place in the vicinity of Zones 3 and 4. In such case, it might make sense to sweep this area clean first and then follow up with subsequent sweeps later as permitted.

Other partial sweeps in FIG. 10A include a dual zone sweep 246 which concurrently sweeps both adjacent Zones 5 and 6 before proceeding to service further access operations. Arrow 248 shows that Zone 6 is swept a second time at a later point in the partial cleaning sequence. An advantage of a multi-directional zone ordering such as in FIG. 10A is that those areas most likely to be effected by contaminants are swept first so as to support the ongoing servicing of host commands at an acceptable data transfer rate. This is balanced against ultimately getting all of the media surfaces swept so that the contaminants are safely deposited to the OD and/or ID.

FIG. 10B is similar to FIG. 10A except FIG. 10B shows a single direction partial cleaning operation in which all of a number of partial cleaning sweeps, from sweep 250 to sweep 252, are carried out in a single direction (in this case, toward the ID). As discussed previously, the transducer(s) may be relocated between the various partial sweeps to service host access commands at any desired radius. Once sufficient time is available to perform the next sweep, the transducer(s) are returned and the next partial sweep is performed. Ultimately, the entirety of the various surfaces are covered and the particulates are urged to a position adjacent the ID. As before, multiple zones may be concurrently swept, as indicated by multi-zone sweep 254 which covers Zones 5-7. A sequence such as in FIG. 10B is suitable for use in an elevator-type scheduling scheme where the transducers are slowly migrated back and forth across the media to service the received commands.

FIG. 10C illustrates different forms of full cleaning sweep operations. Arrow 260 represents a continuous, single direction sweep from OD to ID. As noted above, this may be carried out if sufficient time permits such as during an idle mode of operation. The full cleaning sweep operation may be performed in multiple directions, such as shown by sweeps 262 and 264. In FIG. 10C, it is contemplated that the system performs the initial sweep 262 to clear Zones 4 through 10 toward the ID, followed by sweep 264 to clear Zones 3 through 1 toward the OD.

Figure 11:
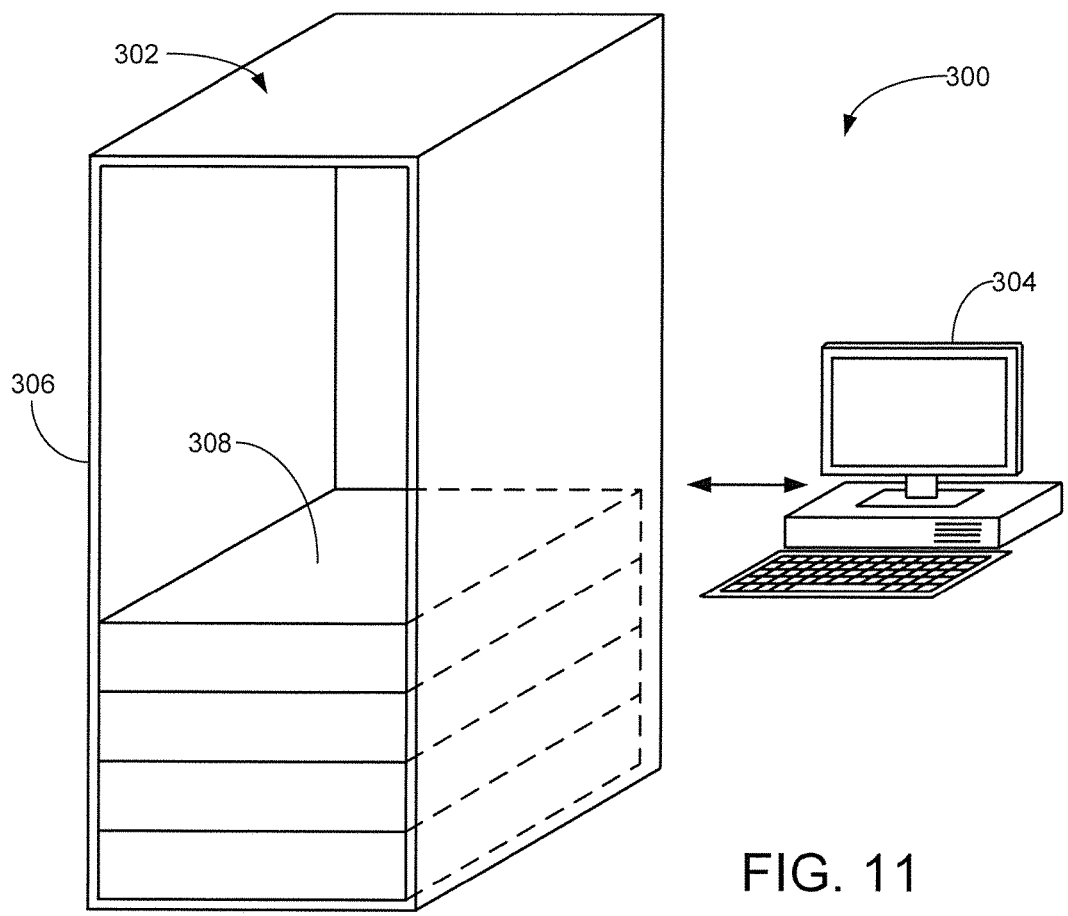
FIG. 11 shows a multi-data storage device computing system in accordance with further embodiments.

FIG. 11 is a schematic depiction of a data storage system 300 in which various embodiments of the present disclosure may be advantageously practiced. The data storage system 300 is a mass-data storage system in which a large population of data storage devices such as 100 are incorporated into a larger data storage space to provide a storage node as part of a larger geographically distributed network. Examples include a cloud computing environment, a network attached storage (NAS) application, a RAID (redundant array of independent discs) storage server, etc.

The system includes a storage assembly 302 and a computer 304 (e.g., server controller, etc.). The storage assembly 302 may include one or more server cabinets (racks) 306 with a plurality of modular storage enclosures 308. While not limiting, the storage rack 306 is a 42 U server cabinet with 42 units (U) of storage, with each unit extending about 1.75 inches (in) of height. The width and length dimensions of the cabinet can vary but common values may be on the order of about 24 in.×36 in. Each storage enclosure 308 can have a height that is a multiple of the storage units, such as 2 U (3.5 in.), 3 U (5.25 in.), etc. to accommodate a desired number of adjacent storage devices 100, as shown in FIG. 12.

Figure 12:
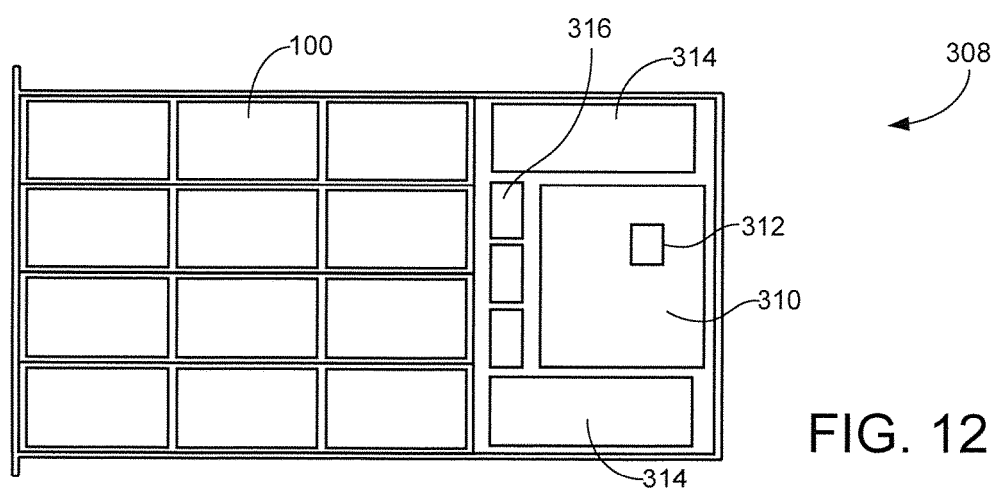
FIG. 12 shows a storage enclosure of the system of FIG. 11 that incorporates a number of data storage devices configured in accordance with various embodiments.

FIG. 12 is a top plan view of a selected storage enclosure 308 that incorporates 36 (3×4×3) data storage devices 100. Other numbers and arrangements of data storage devices 100 can be incorporated into each enclosure. The storage enclosure 308 includes a number of active elements to support the operation of the various storage devices, such as a controller circuit board 310 with one or more processors 312, power supplies 314 and cooling fans 316.

The modular nature of the various storage enclosures 308 is provided to permit removal and installation of each storage enclosure into the storage rack 306 including under conditions where the storage devices 100 in the remaining storage enclosures within the rack are maintained in an operational condition. In some cases, the storage enclosures may further be configured with access panels or other features along the outwardly facing surfaces to permit individual storage devices, or groups of devices, to be removed and replaced. Sliding trays, removable carriers and other mechanisms can be utilized to allow authorized agents to access the interior of the storage enclosures as required.

From this it can be seen that storage devices 100 operated in an environment such as depicted in FIGS. 11 and 12 can be subjected to a number of mechanical disturbance events that may produce the migration of contaminants to the various storage surfaces. These can include operation of adjacent storage devices 100, operation of the fans 316 and the other active elements within the respective storage enclosures 308, and the actions of authorized agents to remove and install storage enclosures 308 or individual/groups of storage devices and other active elements therein. Accordingly, configuring each of the storage devices with a mitigation system such as 150 described above can advantageously enhance the various storage devices within the storage system to maintain optimum performance in light of potential contaminant disruption from these and other regularly encountered events from the surrounding environment.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. A data storage device, comprising:
    a radially moveable data transducer adjacent a rotatable data recording surface;
    a data transfer circuit configured to direct a transfer of user data between the data recording surface and a host device responsive to data access commands issued by the host device;
    a mechanical disturbance sensor configured to detect a mechanical disturbance event externally applied to the data recording surface; and
    an adaptive cleaning circuit configured to perform a media cleaning operation by advancing the data transducer across the data recording surface from a first radius to a second radius over a selected time duration responsive to the mechanical disturbance event having a magnitude that exceeds a predetermined threshold, the selected time duration selected responsive to a rate at which the data access commands are issued to the data storage device.

2. The data storage device of claim 1, wherein the selected time duration is selected by the adaptive cleaning circuit responsive to a total number of the data access commands pending in a command queue pending servicing by the data transfer circuit.

3. The data storage device of claim 1, wherein the adaptive cleaning circuit is configured to determine a maximum available delay time between the servicing of first and second pending commands that have been received from the host device and are awaiting servicing by the data transfer circuit, and to identify the selected time duration to be equal to or less than the maximum available delay time.

4. The data storage device of claim 1, wherein the media cleaning operation is a partial cleaning operation comprising a plurality of segments each comprising a movement of the transducer across different portions of the data recording surface, wherein the data transfer circuit executes at least one pending data access command between successive segments.

5. The data storage device of claim 1, wherein the media cleaning operation is a full cleaning operation comprising one or more movements of the transducer that collectively cover an entirety of the data recording surface without execution of an intervening data access command by the data transfer circuit.

6. The data storage device of claim 1, wherein the media cleaning operation comprises a plurality of overlapping spiral paths of the transducer from a first radius to a second radius on the data recording surface.

7. The data storage device of claim 1, wherein the adaptive cleaning circuit determines a total cleaning time required to sweep the data transducer using overlapping spiral paths between an outermost diameter (OD) and an innermost diameter (ID) of the data recording surface.

8. The data storage device of claim 7, wherein the adaptive cleaning circuit further determines a command completion time as a maximum allowable time before a pending data access command in a command queue is required to be completed, compares the command completion time to the total cleaning time.

9. The data storage device of claim 8, wherein the adaptive cleaning circuit performs a full cleaning operation to sweep the transducer using overlapping spiral paths across the entirety of the data recording surface between the OD and the ID responsive to the total cleaning time being less than the command completion time, after which the data transfer circuit services the pending data access command before conclusion of the command completion time.

10. The data storage device of claim 8, wherein the adaptive cleaning circuit performs a partial cleaning operation to sweep the transducer using overlapping spiral paths over a first portion of the data recording surface between the OD and the ID responsive to the total cleaning time being greater than the command completion time, after which the data transfer circuit services the pending data access command before conclusion of the command completion time.

11. The data storage device of claim 1, wherein the data storage device is mounted and operated within a multi-device data storage enclosure which houses a population of additional data storage devices nominally identical to the data storage device.

12. The data storage device of claim 1, wherein the mechanical disturbance sensor is at least a selected one of a shock sensor, an accelerometer or a spindle motor speed monitor.

13. The data storage device of claim 1, wherein the mechanical disturbance sensor generates a disturbance signal responsive to the mechanical disturbance event and compares a magnitude of the disturbance signal to a predetermined threshold, the mechanical disturbance sensor, the mechanical disturbance sensor providing a notification signal to the adaptive cleaning circuit responsive to the magnitude of the disturbance signal exceeding the predetermined threshold.

14. The data storage device of claim 13, wherein the predetermined threshold is selected responsive to an accumulated count of off track errors encountered by the transducer after a previously detected mechanical disturbance event.

15. A method comprising:
    servicing data access commands issued by a host device to transfer user data between the host device and a rotatable data recording surface using a radially moveable data transducer;
    detecting a mechanical disturbance event externally applied to the data recording surface; and performing a media cleaning operation by advancing the data transducer across the data recording surface from a first radius to a second radius over a selected time duration responsive to the mechanical disturbance event having a magnitude that exceeds a predetermined threshold, the selected time duration selected responsive to a rate at which the data access commands are issued to the data storage device.

16. The method of claim 15, further comprising:

determining a total cleaning time required to sweep the data transducer using overlapping spiral paths between an outermost diameter (OD) and an innermost diameter (ID) of the data recording surface;

identifying a command completion time as a maximum allowable time before a pending data access command in a command queue is required to be completed; and comparing the command completion time to the total cleaning time.

17. The method of claim 16, further comprising performing a full cleaning operation to sweep the transducer using overlapping spiral paths across the entirety of the data recording surface between the OD and the ID responsive to the total cleaning time being less than the command completion time, followed by servicing the pending data access command prior to conclusion of the command completion time.

18. The method of claim 16, further comprising performing a partial cleaning operation to sweep the transducer using overlapping spiral paths over a first portion of the data recording surface between the OD and the ID responsive to the total cleaning time being greater than the command completion time, followed by servicing the pending data access command prior to conclusion of the command completion time.

19. The method of claim 15, further comprising identifying the selected time duration responsive to a total number of the data access commands pending in a command queue pending servicing by the data transfer circuit.

20. The method of claim 15, wherein the media cleaning operation is a partial cleaning operation comprising a plurality of segments each comprising a movement of the transducer across different portions of the data recording surface, wherein at least one pending data access command is serviced between successive segments.

\* \* \* \* \*